United States Patent [19]

Morii et al.

[11] Patent Number: 4,925,640

[45] Date of Patent: May 15, 1990

[54] METHOD FOR DENITRATION OF EXHAUST GAS CONTAINING ARSENIC COMPOUNDS BY CATALYSTS AND METHOD

[75] Inventors: Atsushi Morii; Toshio Koyanagi; Hiromu Takatsuka; kouzou Iida, all of Nagasaki, Japan

[73] Assignee: Mitsubishi Jukogyo Kabushiki Kaisha, Tokyo, Japan

[21] Appl. No.: 232,610

[22] Filed: Aug. 15, 1988

[30] Foreign Application Priority Data

Aug. 14, 1987 [JP] Japan .................................. 62-201878
Sep. 30, 1987 [JP] Japan .................................. 62-244135

[51] Int. Cl.$^5$ .......................... B01J 8/00; C01B 17/00
[52] U.S. Cl. ..................................................... 423/239
[58] Field of Search ........................... 423/239, 239 A

[56] References Cited

U.S. PATENT DOCUMENTS 4,572,903  2/1986  Hino et al. ........................... 423/239

FOREIGN PATENT DOCUMENTS 0136966  4/1985  European Pat. Off. .
2235426  2/1974  Fed. Rep. of Germany .
2341040  9/1977  France .

*Primary Examiner*—Gregory A. Heller
*Attorney, Agent, or Firm*—McAulay Fisher Nissen & Goldberg

[57] ABSTRACT

A new method for denitration by ammonia of exhaust gas containing arsenic compounds which degrades a denitrating catalyst used is disclosed as well as a method and an apparatus, based on the same principle as the above method, for regenerating an already degraded catalyst. These effects are achieved, without taking the catalyst out of the system, by adjusting the humidity and temperature of the atmosphere surrounding the catalyst filled in the denitration reactor with simple and economical means so that arsenic compounds accumulated on the catalyst surface will diffuse into the catalyst reducing their concentration on the surface, which is important for the catalytic action.

14 Claims, 3 Drawing Sheets

METHOD FOR DENITRATION OF EXHAUST GAS CONTAINING ARSENIC COMPOUNDS BY CATALYSTS AND METHOD

BACKGROUND OF THE INVENTION

Field of the Invention

The present invention relates to dry denitration by ammonia of exhaust gas containing an arsenic component in the presence of a denitrating catalyst. More particularly, it pertains to a method for denitration that is capable of preventing the catalyst used from deteriorating, and to a method and an apparatus for regenerating a denitrating catalyst that is already degraded by the arsenic component of the exhaust gas being treated.

As a method for reducing NOx in exhaust gas from boilers, the dry denitration method using ammonia as a reducing agent is commonly employed. Since catalysts used in this method are active at gas temperatures between 200° and 450° C., a denitration reactor is commonly disposed between an outlet of a boiler fuel economizer and an inlet of an air preheating apparatus. In the following, a typical flow in a basic denitration method of this kind will be explained with reference to FIG. 1.

In FIG. 1, exhaust gas coming out of a fuel economizer 6 of a boiler 1 is sent to a denitration reactor 3 disposed in the upstream position of an air preheater via an exhaust gas duct 7 and is denitrated there. Ammonia, which is a reducing agent, is supplied from an ammonia supply apparatus 2 that is disposed on the exhaust gas duct in the upstream position of the denitration reactor. NOx in the exhaust gas is decomposed into water and nitrogen by the ammonia thus supplied and the denitration catalyst filled in the denitration reactor 3.

The exhaust gas, having been denitrated in the denitration reactor 3, goes through the air preheater 4 and the exhaust gas duct 7 and is removed of dust in a dust collector 5 and sent to the next process such as wet desulfurization.

Also, as shown in FIG. 3, it is possible to send the air for combustion into the boiler 1 by a forced draught fan (called F.D.F. hereinafter) 9 through an air duct 8 after preheating it in the air preheater 4.

When the denitration reactor 3 is attached to the exhaust gas duct 7 between an outlet of the boiler fuel economizer 6 and an inlet of the air preheater 4, if the fuel contains arsenic compounds, the exhaust gas at an inlet of the denitration reactor 3 also contains arsenic compounds. These gaseous arsenic compounds accumulate on the denitrating catalyst filled in the denitration reactor 3 and degrade the performance of the catalyst in a rather short period of time. This degradation of performance of the catalyst cannot be avoided under normal operating conditions of the denitration reactor 3. Therefore, replacement of the catalyst or the like is necessary to avoid lower performances, and this causes cost problems.

Further, in order to avoid the influence of arsenic compounds, the possibility of sending the exhaust gas from an outlet of a wet desulfurization apparatus, after reheating it, to a denitration apparatus has been considered. However, this possibility makes a reheating device and the fuel for reheating necessary. They, as well as the replacement of the catalyst described above, lead to a quite significant increase in costs.

OBJECTS AND SUMMARY OF THE INVENTION:

It is an object of the present invention to provide a method for denitration of exhaust gas in which a denitrating catalyst that is inevitably degraded by arsenic compounds in the above basic denitration process can be regenerated and the performance of the denitrating catalyst can be maintained at a high level for a long period of time by simple and economical means without taking the catalyst out of the system.

It is another object of the present invention to provide a method and an apparatus for regenerating a degraded denitrating catalyst by simple and economical means without taking the catalyst out of the system.

The inventors of the present invention discovered, as a result of investigation on the degradation of denitrating catalysts by arsenic components, that the reason for such degradation is an accumulation of arsenic components on the very surface of the catalyst at high concentration. The following research on how such a reason can be removed made it clear that the original catalytic performance can be recovered by letting the arsenic components diffuse into the inside of the catalyst and by thus reducing the concentration of arsenic components on the catalyst surface. Also, it is confirmed that the arsenic components accumulated on the surface can be, easily and in a short period of time, diffused into the inside of the denitrating catalyst by adjusting the moisture of the atmosphere in which the denitrating catalyst is placed using the water containing nature of the catalyst itself and by maintaining the temperature low at the same time. These findings have led to the present invention.

Namely, the present invention provides:

(1) A dry denitration method for denitrating an exhaust gas containing arsenic compounds by ammonia in the presence of a denitrating catalyst, being characterized in that steam is supplied to a dry denitration reactor so that the atmosphere in this reactor has a relative humidity equal to or more than 40%.

(2) A method for regenerating a denitrating catalyst that has been degraded by arsenic components during dry denitration of an exhaust gas containing arsenic compounds by ammonia in the presence of the denitrating catalyst, being characterized in that steam is supplied to a dry denitration reactor so that the atmosphere in this reactor filled with the catalyst has a relative humidity equal to or more than 40%.

(3) A method for regenerating a denitrating catalyst that has been degraded by arsenic components during dry denitration of an exhaust gas containing arsenic compounds by ammonia in the presence of a denitrating catalyst, being charactrized in that steam is supplied to a dry denitration reactor so that the atmosphere in this reactor filled with the catalyst has a relative humidity equal to or more than 40% and at the same time the temperature of atmosphere in the denitration reactor is maintained at 100° C. or less.

(4) An apparatus for regenerating a denitrating catalyst degraded by arsenic components in a dry denitration reactor for dry denitrating of an exhaust gas containing arsenic compounds by ammonia in the presence of the denitrating catalyst, being characterized in that cool air supply means and steam supply means are attached to an exhaust gas duct on the upstream side of this dry denitration reactor, and that at least one damper is disposed in this exhaust gas duct on the upstream side of these means.

DETAILED DESCRIPTION OF THE PREFERRED EMBODIMENTS

Figure 1:
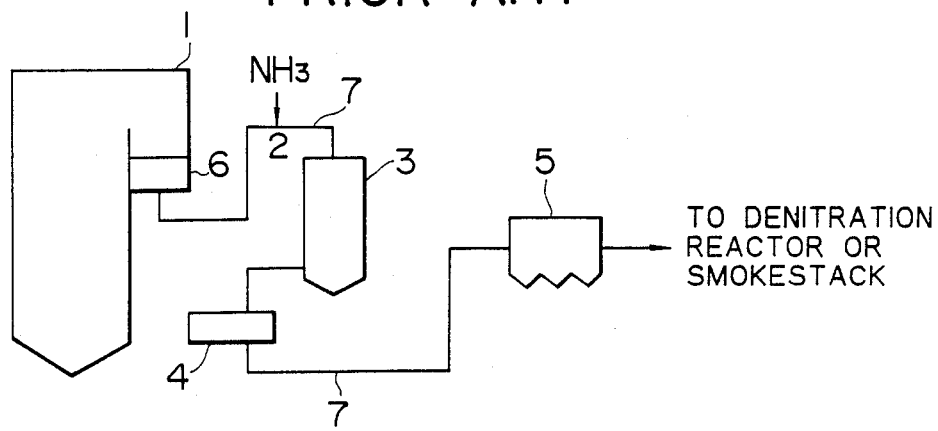
FIG. 1 is a schematic diagram showing basic flow for denitration of NOx contained in exhaust gas using a denitrating catalyst and ammonia as a reducing agent.

In (1) above, it is desirable to blow steam into the exhaust duct using an ammonia supply nozzle when maintaining the relative humidity of the atmosphere in the denitration reactor, where the denitrating catalyst is placed, in the above specified range.

In (1), (2) and (3) above, the relative humidity is adjusted to be equal to or more than 40% because experimental results confirmed that this range is most desirable. If the relative humidity is less than 40% the diffusion effect of arsenic components into the inside of the denitrating catalyst is minimal.

Also in (3) above, the temperature is maintained at or less than 100° C. under the same humidity condition as above. This is also confirmed experimentally and will be clarified by the working examples below.

Further, in (2) and (3) above, while a steam supply nozzle can be disposed in the duct in order to blow steam into the duct for maintaining the relative humidity of atmosphere in the dry denitration reactor at or above 40%, the ammonia supply nozzle, which is already disposed, may also be used, and steam can be blown through this nozzle.

In addition, in order to make the temperature of atmosphere of the dry denitration reactor at or below 100° C. it is possible to stop the operation of a source of exhaust gas, such as, the boiler, and send cool air through the boiler and the duct into the dry denitration reactor. If cool air is supplied through the boiler, however, since it takes a long time to warm up the boiler to a desirable temperature when restarting it, separate air supply means should be disposed at a position upstream from the dry denitration reactor.

It should be noted that the relative humidity can be raised up to 100% only if the dust attached to the surface of the denitrating catalyst is completely removed. If some dust is present on the surface of the catalyst, relative humidity above 90% should be avoided. The reason for this is that, if the relative humidity is more than 90%, although the diffusion effect of arsenic the components is high, certain compounds, such as, alkaline and alkaline earth metal compounds which are harmful to the denitrating catalyst and which come from the dust attached to the catalyst surface also diffuse into the inside of the catalyst with moisture. This may minimize the recovery of catalyst performance or even degrade the catalyst further.

As denitrating catalysts in the present invention, a variety of catalysts may be used. Among them, typical ones are one or two oxides of vanadium, tungsten, molybdenum, silicon, cerium carried on a titania carrier.

In the following, with reference to the drawings, some basic embodiments of the present invention will be explained in comparison to examples of the conventional method. The denitration method of the present invention will be explained first, Subsequently, the regeneration method and apparatus for degraded catalysts of the present invention will be explained. Throughout the drawings, FIGS. 1 to 6, the same part is identified by the same numeral.

Figure 2:
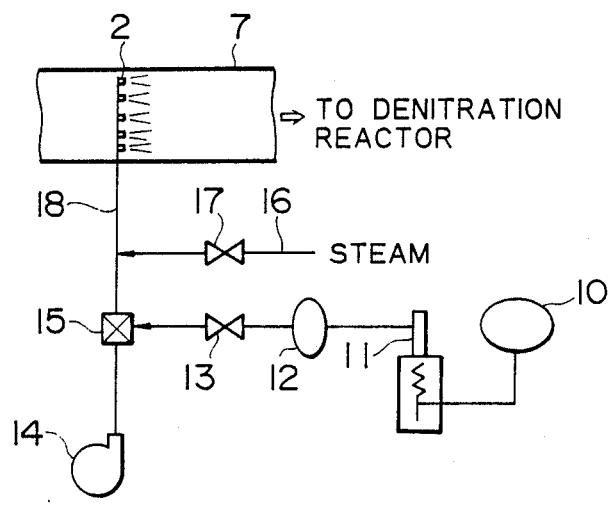
FIG. 2 is a schematic diagram of an embodiment of the ammonia supply apparatus with an attached steam supply tube used in the denitration method of the present invention.
Figure 3:
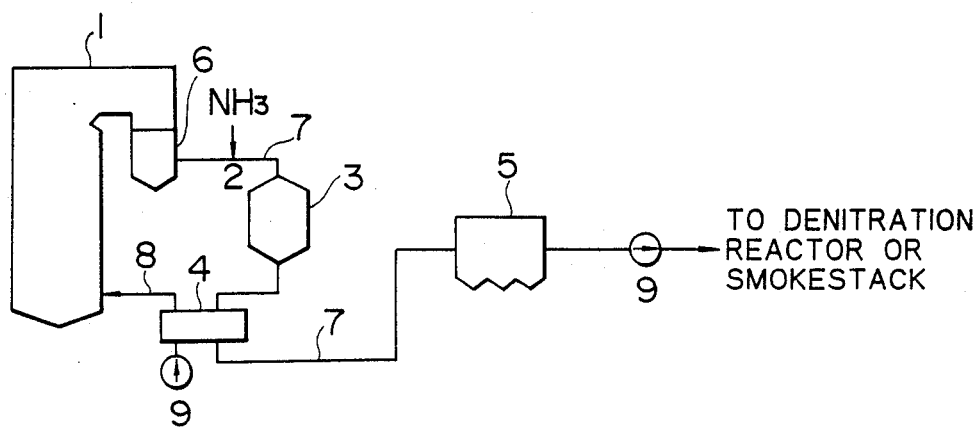
FIG. 3 is a schematic diagram explaining a conventional dry denitration method and apparatus.

First, with reference to FIG. 2 an embodiment of the denitration method of the present invention will be explained. FIG. 2 shows an ammonia supply apparatus having also the function of supplying steam. This apparatus is connected to the ammonia supply nozzle 2 of FIG. 1. This ammonia supply apparatus with the function of supplying also steam is constructed as follows. Ammonia is sent from an ammonia tank 10 through an ammonia vaporizer 11, an accumulator 12 and a valve 13 to a dilution device 15. Ammonia is diluted in the dilution device 15 with the air sent by a dilution fan 14, and supplied into a gas exhaust gas duct 7 through an ammonia supply nozzle 2 via an injection tube 18. A steam tube 16 is connected to the injection tube 18. When a valve 17 is opened, steam can introduced into the duct 7 through the ammonia supply nozzle via the ammonia injection tube 18.

In operating an exhaust gas denitration system having an ammonia supply apparatus of this type with the function of supplying steam into the system, if the denitrating catalyst in the system degrades because of arsenic compounds in the exhaust gas, steam is sent into the system through the ammonia supply nozzle 2 via the injection tube 18 after the boiler 1 is stopped or while the boiler is not in operation; namely, when the temperature of the atmosphere in the denitration reactor 3 becomes equal to or less than 100° C. Steam can be supplied intermittently so that the relative humidity is maintained at or above 40%.

Next, a basic embodiment of the regeneration method and apparatus of the present invention will be explained with reference to FIG. 4.

Figure 4:
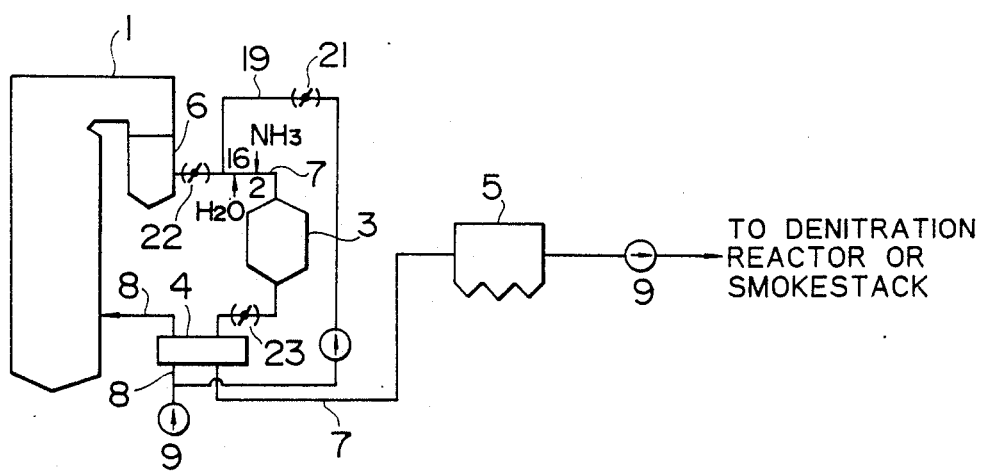
FIG. 4 is a schematic diagram of a basic embodiment of the regeneration method and apparatus of the present invention.

In FIG. 4, an air duct 8 is connected to a boiler 1 into which the air for combustion preheated in an air preheater 4 is sent by a F.D.F. 9. Fuel is supplied through a burner (not shown) separated from the air duct 8. The exhaust gas resulting from combustion in the boiler 1 goes through an fuel economizer 6 and is denitrated in a denitration reactor 3. Then the exhaust gas is sent through an exhaust gas duct 7, the air preheater 4 and a dust collector 5 to the subsequent process by another F.D.F. 9.

An ammonia supply apparatus 2 and a steam supply apparatus 16 are attached onto the above exhaust gas duct 7 at an upstream position of the denitration reactor 3. In addition, a denitration upstream damper 22 is disposed in the further upstream of these two apparatus. Also, a denitration downstream damper 23 can be disposed in the exhaust gas duct in a downstream position of the denitration reactor 3 if necessary.

Further, a cool air supply device 19 is connected to the exhaust gas duct 7 at a position upstream from the denitration reactor 3 and downstream from the denitration upstream damper 22. As shown in FIG. 4 this cool air supply device 19 may be a duct that branches out from the air duct 8 connected to the F.D.F. 9. The duct in this case (namely, the cool air supply device 19) has to have a cool air damper 21 so that this duct can be closed completely. Nevertheless it should be obvious that the air can also be sent into the system by a fan through a completely different route from the means shown in FIG. 4.

Now, with reference to FIG. 5, the connection between the cool air supply device 19 and the exhaust gas duct 7 and that between the steam supply apparatus 16 and the duct 7 will be explained in detail.

Figure 5:
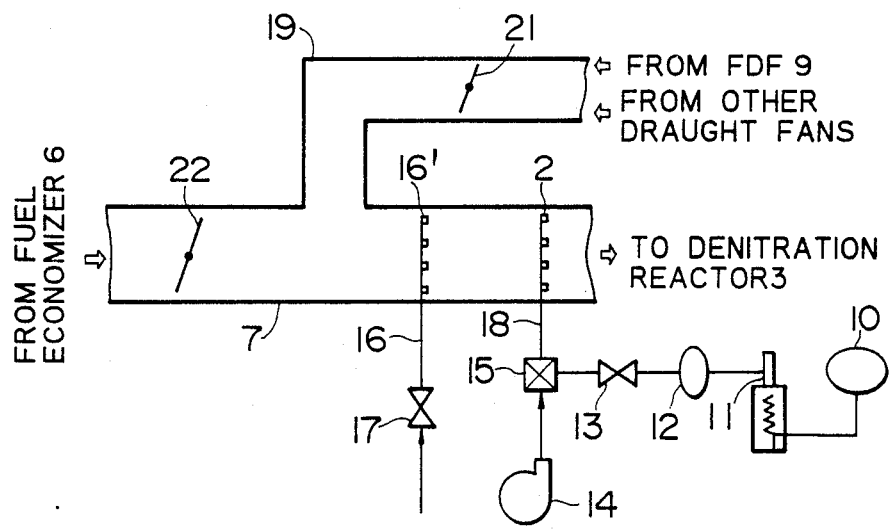
FIGS. 5 and 6 are schematic diagrams to show, as examples, means for controlling the humidity and temperature of the dry denitration reactor filled with a denitrating catalyst.

In FIG. 5, the ammonia supply apparatus (nozzle) 2 is conventionally disposed in the exhaust gas duct 7 at an upstream position of the denitration reactor 3 (shown schematically). Near this ammonia supply apparatus 2, the steam supply apparatus 16 (whose nozzle is indicated by 16') having a valve 17 is disposed according to the present invention. This steam supply apparatus 16 is essentially a tube that passes steam and can be almost anything if it has injection holes or nozzles or the like inside the exhaust gas duct 7. Also in this embodiment, the cool air supply device 19 is a similar duct as the exhaust gas duct 7. This cool air supply device 19 only needs to be connected to this duct 7 and to have the cool air damper 21 so that the exhaust gas or cool air can be cut off. In the upstream of these, the denitration upstream damper 22 is disposed.

The ammonia supply apparatus 2 in this embodiment comprises an ammonia tank 10, an ammonia vaporizer 11, an accumulator 12, a valve 13, a dilution fan 14, a dilution device 15 and an injection tube 18. Ammonia sent from the ammonia tank 10 through the ammonia vaporizer 11 and the accumulator 12 is diluted in the dilution device 15 with the air sent by the dilution fan 14 and injected into the duct 7 by the ammonia supply apparatus 2 via the injection tube 18.

Figure 6:
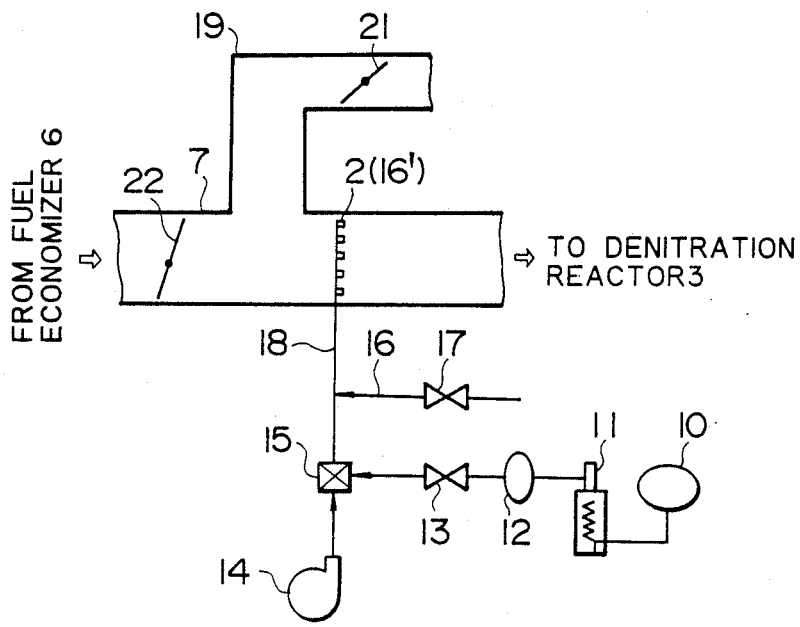

Also, the steam supply apparatus 16 of FIG. 5 and the ammonia supply apparatus 2 may be unified as shown in FIG. 6. Namely, the steam supply apparatus 16 is connected to the injection tube 18 of the ammonia supply apparatus 2 described in FIG. 2. When ammonia is not being injected, the valve 17 can be opened so that steam is injected into the duct 7 through the nozzle of the ammonia supply apparatus 2. Further, according to this embodiment the cool air supply device 19 may also be omitted. In such a case, when ammonia is not being injected; namely, while the valve 13 is closed, the valve 17 is also closed and cool air can be supplied into the duct 7 by the dilution fan 14.

In operating the exhaust gas denitration apparatus having the cool air supply and steam supply functions described above using FIGS. 4 to 6, if the catalyst in the denitration reactor 3 degrades because of an arsenic component in exhaust gas, after the boiler 1 is stopped or while it is not in operation, the denitration upstream damper 22 is closed and the cool air damper 21 of the cool air supply device 19 is opened so that cool air can be supplied by the F.D.F. 9 to cool down the temperature of atmosphere in the denitration reactor to 100° C. or less. Then, after steam is supplied by the steam supply apparatus 16, the denitration downstream damper 23 disposed in the downstream of the denitration reactor 3 is closed, and steam is supplied intermittently to maintain the relative humidity of the denitration reactor 3 at 40% or more. Thus, the denitrating catalyst degraded by an arsenic component in the exhaust gas is now regenerated.

Also, after the boiler 1 stops and after the denitration upstream damper 22 is closed, steam and cool air may be supplied at the same time by the steam and cool air supply apparatuses 16, 19. Then, the denitration downstream damper 23 is closed, and either of steam and cool air can be supplied intermittently or continuously to maintain the temperature of the denitration reactor 3 at 100° C. or less and the relative humidity at 40% or more.

Furthermore, the following operation is also possible. The denitration upstream damper 22 is closed immediately after the boiler 1 halts. Then the injection of ammonia and steam is stopped (namely, the valves 13, 17 are closed) as explained in connection with FIG. 6. Cool air is supplied using the ammonia supply apparatus 2, and the denitration downstream damper 23 is closed so that the atmosphere in the denitration reactor has a low temperature equal to or less than 100° C. Next, the valve 17 is opened to supply steam using the same ammonia supply apparatus 2. This valve 17 is opened and closed intermittently so as to maintain the temperature at 100° C. or less and the relative humidity at 40% or more.

As explained above, when the atmosphere surrounding the denitrating catalyst becomes humid with a relative humidity equal to or more than 40%, water quickly permeates into the catalyst due to the water containing nature of the catalyst, and the arsenic compounds accumulated on the very surface of the catalyst diffuse into the inside with the water, making the concentration of arsenic compounds almost uniform on the inside and surface of the catalyst. As a result, the concentration of arsenic compounds on the catalyst surface decreases, improving the denitration efficiency.

In the following, the above facts will be proved by the following examples

EMBODIMENT 1

Under the presence of a catalyst described below, an exhaust gas with the composition shown below was treated for about 600 hours at 370° C.

Denitrating catalyst A catalyst formed by clay and containing 80-85 weight % of a mixture of a carrier $TiO_2$ (89-90 weight %), $V_2O_5$ (1 weight %) and $WO_3$ (the rest).

Composition of exhaust gas:
  $O_2$: 4%
  NOx : 1,000 ppm
  SOx : 1,500 ppm
  Dust: $30 \times 10^3$ mg/Nm$^3$
  Arsenic Compounds (as As) 100 = 1,000 $\mu$g/Nm$^3$ Attached dust was removed from the denitrating catalyst after about 600 hours of treatment, and then steam was supplied into the denitration reactor to vary the relative humidity of the atmosphere in the reactor. The recovery of the performance of the catalyst was measured as follows. (The experimental condition for comparing catalytic i.e., denitration, performance was: The gas composition was the same as above, the gas temperature 380° C. and NH$_3$/NOx =1.0.)

| Catalyst | Relative humidity in the reactor | Regeneration time | Denitration efficiency (in laboratory) | Catalyst surface As$_2$O$_3$ (wt %) |
|---|---|---|---|---|
| Fresh catalyst | — | — | 96.8% | ≈0 |
| After 600 hrs. of denitration | — | — | 81.4% | 3.8 |
| After adjusting relative humidity | 20% | 72 hrs | 81.4% | 3.8 |
| | 30% | 72 hrs | 82% | 3.7 |
| | 40% | 72 hrs | 83.4% | 3.5 |
| | 50% | 72 hrs | 84% | 3.3 |
| | 60% | 72 hrs | 85.3% | 3.1 |
| | 70% | 72 hrs | 88.3% | 2.5 |
| | 80% | 72 hrs | 93.2% | 1.3 |
| | 90% | 72 hrs | 94.6% | 0.9 |
| | 100% | 72 hrs | 94.6% | 0.9 |

EMBODIMENT 2

The catalyst treated under the same condition as in Embodiment 1 was experimented at varying humidities without removing dust attached to the catalyst. The result are shown below.

| Catalyst | Relative humidity in the reactor | Regeneration time | Denitration efficiency (in laboratory) | Catalyst surface As$_2$O$_3$ (wt %) | Catalyst surface Na$_2$O + K$_2$O (wt %) |
|---|---|---|---|---|---|
| Fresh catalyst | — | — | 96.8 | ≈0 | 0.03 |
| After 600 hrs. of denitration | — | — | 81.4 | 3.7 | 0.03 |
| After adjusting relative humidity | 20% | 72 hrs | 81.4 | 3.7 | 0.03 |
| | 30% | 72 hrs | 82.2 | 3.7 | 0.03 |
| | 40% | 72 hrs | 83.1 | 3.4 | 0.03 |
| | 50% | 72 hrs | 84.4 | 3.2 | 0.03 |
| | 60% | 72 hrs | 85.5 | 3.1 | 0.03 |
| | 70% | 72 hrs | 88.1 | 2.5 | 0.04 |
| | 80% | 72 hrs | 92.3 | 1.3 | 0.08 |
| | 90% | 72 hrs | 92.9 | 0.9 | 0.2 |
| | 100%* | 72 hrs | 92.9 | 0.9 | 2.5 |

*Examples of degradation of catalytic capability by Na$_2$O + K$_2$O

EMBODIMENT 3

The catalyst treated under the same condition as in Embodiment 1 was experimented at the relative humidities of 30%, 60%, and 80% after dust attached to the catalyst was sufficiently removed. The temperature of atmosphere in the reactor was maintained at 80° C. The results of recovery of performance thus measured are shown below.

| Regeneration time | Relative humidity | | |
|---|---|---|---|
| | 30% | 60% | 80% |
| 24 hrs | 81.4/3.7 | 84.4/3.3 | 88.3/2.5 |
| 72 hrs | 81.4/3.7 | 85.3/3.1 | 93/1.3 |
| 10 days | 84/3.3 | 90/1.5 | 94.6/0.9 |
| 30 days | 88/2.5 | 94.6/0.9 | 94.6/0.9 |
| 3 months | 94/1.0 | 94.6/0.9 | 94.6/0.9 |

Note:
Denitration efficiency/catalyst surface As$_2$O$_3$ (wt %)

EMBODIMENT 4

An exhaust gas of 380° C. containing an arsenic component was treated by the same catalyst as in Embodiment 1 at the exhaust gas flow speed of about 5 m/sec. (at the entrance to the catalyst layer).

The composition of the exhaust gas was:
O$_2$ : 4–5%
NOx : 500–700 ppm
SOx : 800–1,000 ppm
Dust : 15–20 g/Nm$^3$
Arsenic Component: 100–300 μg/Nm$^3$ (as As)

Dust was sufficiently removed from the catalyst after the above treatment, and recovery of catalytic performance was observed at varying temperatures and humidities. The results are as shown below.

| Catalyst | Relative humidity in the reactor | Temperature in the reactor | Regeneration time | Denitration efficiency | Catalyst surface As$_2$O$_3$ (wt %) |
|---|---|---|---|---|---|
| Fresh catalyst | — | — | — | 94.4% | 0% |
| After 5700 hrs. of denitration | — | — | — | 69.3% | 3% |
| After regeneration | | | | | |
| No. 1 | 40% | 100° C. | 24 hrs | 69.3% | 3% |
| No. 2 | 30% | 100° C. | 24 hrs | 69.3% | 3% |
| No. 3 | 40% | 110° C. | 24 hrs | 69.3% | 3% |
| No. 4 | 30% | 110° C. | 24 hrs | 69.3% | 3% |
| No. 5 | 80% | 80° C. | 24 hrs | 90% | 1.1% |
| No. 6 | 40% | 80° C. | 24 hrs | 76.3% | 2.5% |
| No. 7 | 80% | 150° C. | 24 hrs | 71.5% | 2.9% |

According to the present invention, the problem of degradation of denitration catalysts, often encountered in the process of dry denitration of exhaust gas containing arsenic compounds, can be solved. It is now possible to continue a stable denitration treatment for a long period of time without replacing denitrating catalysts even when exhaust gas contains an arsenic component.

What is claimed is:

1. In a dry denitration method for denitrating an exhaust gas containing arsenic compounds by contacting the gas with ammonia and a denitrating catalyst in a denitration reactor, the improvement which comprises adjusting the atmosphere of the denitration reactor so that the relative humidity is 40% and 100%.

2. The method of claim 1 wherein the relative humidity is adjusted by introducing steam to the reactor.

3. The method of claim 1 wherein the catalyst is treated to remove surface dust therefrom prior to increasing the relative humidity of the reactor.

4. The method of claim 1 wherein the relative humidity is not more than 90%.

5. The method of claim 2 wherein the steam and ammonia are introduced to the reactor through a common supply nozzle.

6. The method of claim 2 wherein the contacting of the exhaust gas is stopped while the steam is supplied to the reactor.

7. The method of claim 2 wherein the contacting of the exhaust gas is stopped while the steam is supplied to the reactor and the temperature of the reactor is decreased to 100° C. or lower.

8. A method for regenerating a denitrating catalyst that has been degraded by arsenic components contained in an exhaust gas during dry denitration by ammonia in the presence of said denitrating catalyst, comprising adjusting the atmosphere of said denitration reactor so that the relative humidity is between at least 40% and 100%.

9. The method of claim 8 wherein the relative humidity is adjusted by introducing steam to the reactor.

10. The method of claim 8 wherein the catalyst is treated to remove surface dust therefrom prior to increasing the relative humidity of the reactor.

11. The method of claim 8 wherein the relative humidity is not more than 90%.

12. The method of claim 9 wherein the steam and ammonia are introduced to the reactor through a common supply nozzle.

13. The method of claim 9 wherein the contacting of the exhaust gas is stopped while the steam is supplied to the reactor.

14. The method of claim 13 wherein the contacting of the exhaust gas is stopped while the steam is supplied to the reactor and the temperature of the reactor is decreased to 100° C. or lower.

* * * * *